United States Patent
Asakura et al.

(10) Patent No.: US 12,252,046 B2
(45) Date of Patent: Mar. 18, 2025

(54) VEHICLE SEAT

(71) Applicants: Adient Engineering and IP GmbH, Burscheid (DE); Subaru Corporation, Tokyo (JP); Toyota Jidosha Kabushiki Kaisha, Toyota (JP)

(72) Inventors: Takayuki Asakura, Tokyo (JP); Akihide Onodera, Tokyo (JP); Satoshi Obara, Tokyo (JP); Hiroshi Eguchi, Yokohama (JP); Hiroyuki Yasui, Yokohama (JP); Nilesh Firke, Maharashtra (IN); Ajeet Tasagave, Maharashtra (IN); Abhinav Chaubey, Maharashtra (IN)

(73) Assignees: Adient US LLC, Plymouth, MI (US); Subaru Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/660,048

(22) Filed: Apr. 21, 2022

(65) Prior Publication Data
US 2022/0340055 A1    Oct. 27, 2022

(30) Foreign Application Priority Data
Apr. 27, 2021 (IN) .............................. 202141019293

(51) Int. Cl.
*B60N 2/427*    (2006.01)
(52) U.S. Cl.
CPC ................................. *B60N 2/42763* (2013.01)

(58) Field of Classification Search
None
See application file for complete search history.

(56) References Cited

U.S. PATENT DOCUMENTS

| 2008/0079296 A1 * | 4/2008 | Endo .................. G01G 19/4142 |
| | | 297/217.2 |
| 2010/0060045 A1 | 3/2010 | Gross et al. |
| 2011/0241391 A1 | 10/2011 | Lamparter et al. |
| 2012/0126591 A1 | 5/2012 | Ruthinowski et al. |
| 2021/0129725 A1 * | 5/2021 | Ishizuka ................. B60R 21/02 |

(Continued)

FOREIGN PATENT DOCUMENTS

| CN | 111483371 A | 8/2020 |
| DE | 102010043293 A1 | 5/2012 |
| GB | 2342076 A * | 4/2000 ........... B60N 2/4221 |

(Continued)

OTHER PUBLICATIONS

Intellectual Property India, Office Action in Application No. 202141019293, dated Nov. 15, 2022, 6 pages.

(Continued)

*Primary Examiner* — David E Allred
(74) *Attorney, Agent, or Firm* — Marshall & Melhorn, LLC

(57) ABSTRACT

A vehicle seat includes a seat back and a cushion seat. The cushion seat includes a seat frame, a cushion pad portion above the seat frame, a first submarining suppression portion below the cushion pad portion, and a second submarining suppression portion below the cushion pad portion, the second submarining suppression portion arranged on a side of the first submarining suppression portion closer to the seat back.

5 Claims, 8 Drawing Sheets

(56) References Cited

U.S. PATENT DOCUMENTS

2021/0291774 A1\* 9/2021 Kondou ............... B60N 2/5883

FOREIGN PATENT DOCUMENTS

| JP | 2001299496 A | 10/2001 |
| JP | 2004058913 A | 2/2004 |
| JP | 2008080904 A | 4/2008 |
| JP | 2013163452 A | 8/2013 |
| JP | 2019034641 A | 3/2019 |
| JP | 2019172237 A | 10/2019 |
| WO | 2019035394 A1 | 2/2019 |

OTHER PUBLICATIONS

China National Intellectual Property Administration, Office Action in CN Application No. 202210433956.5, dated Jul. 20, 2023, 12 pages.
Japan Patent Office, Office Action in Application No. JP2022-032294, dated May 9, 2023, 4 pages.

\* cited by examiner

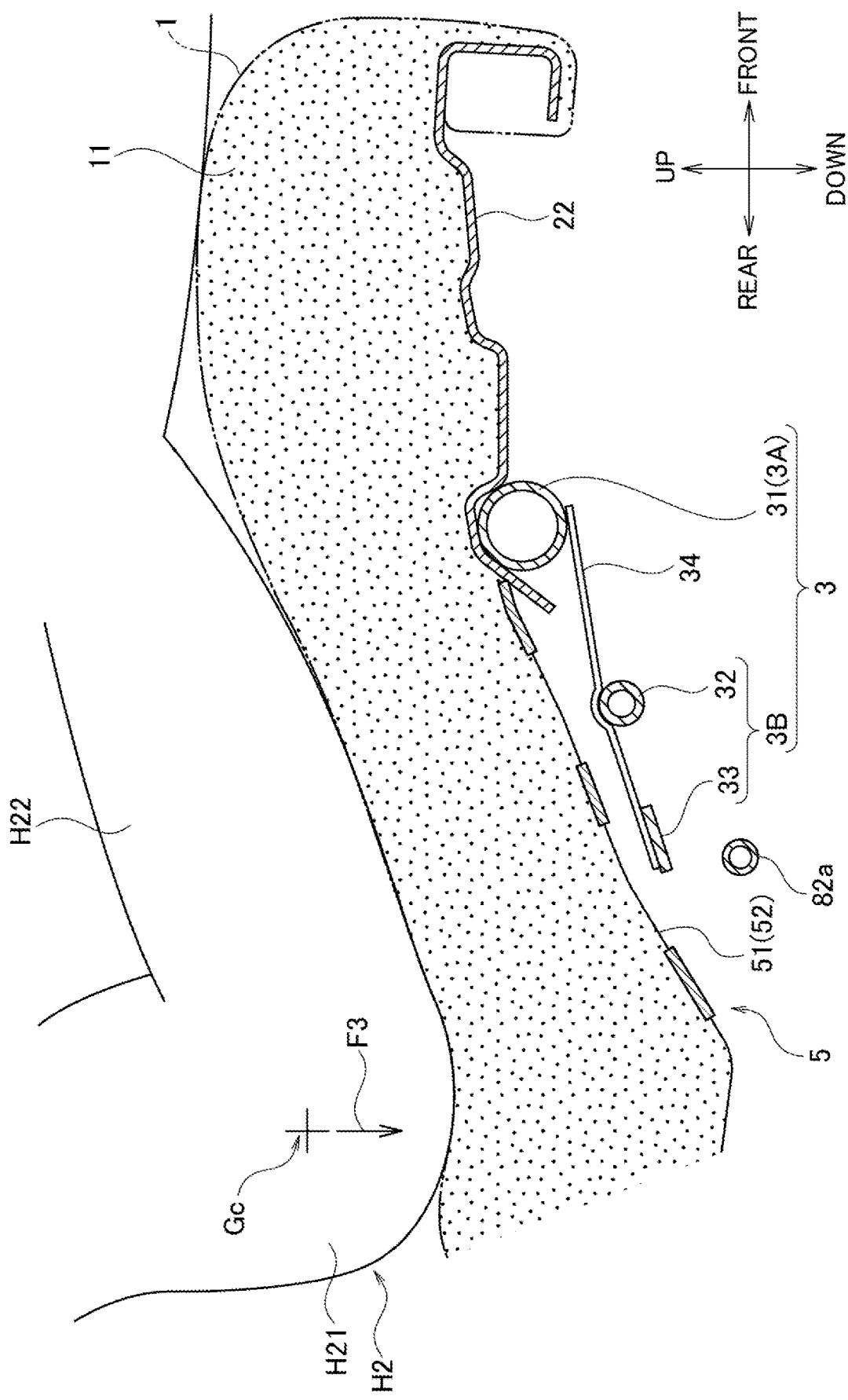

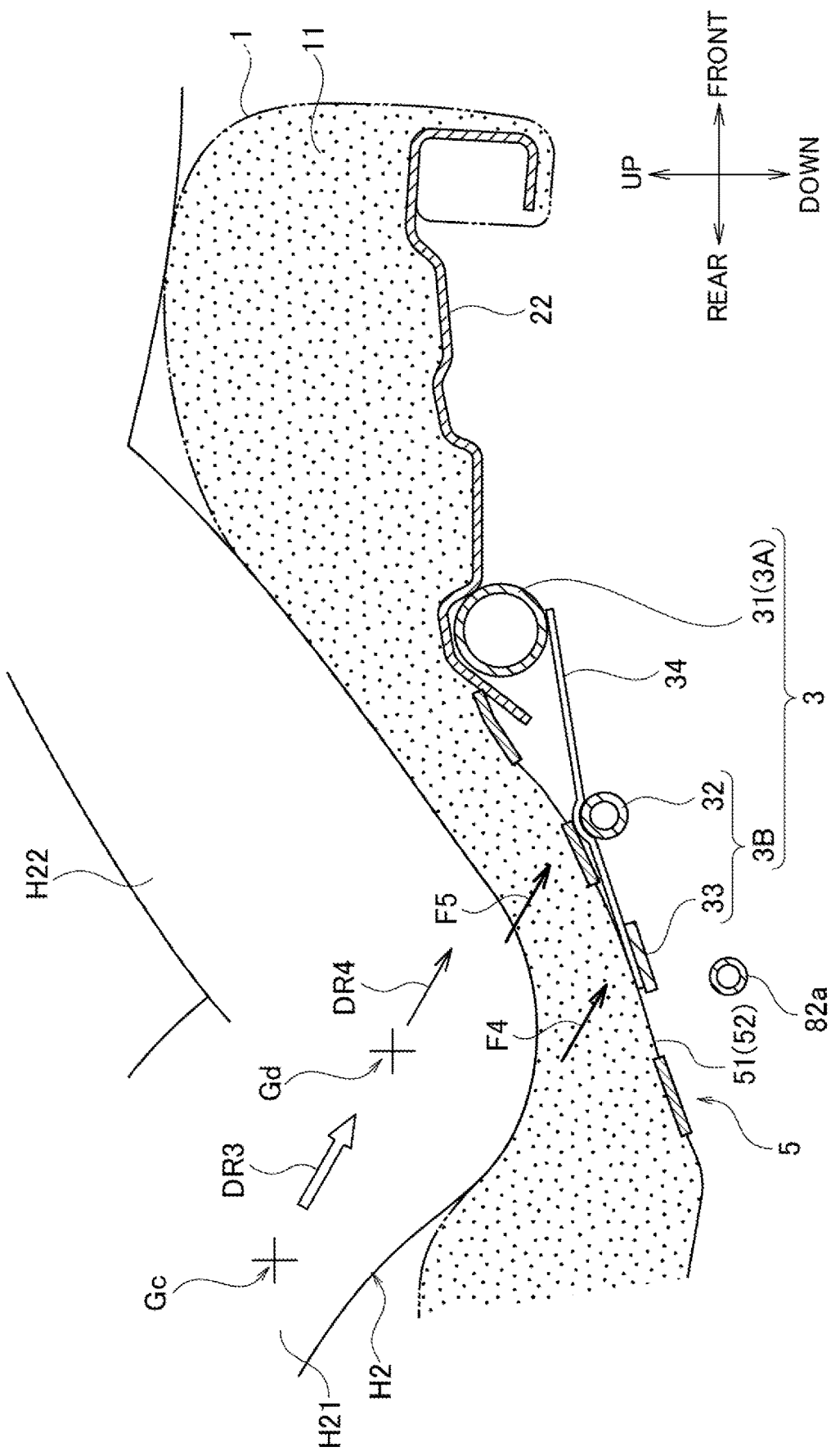

VEHICLE SEAT

BACKGROUND

1. Technical Field

The disclosure relates to a vehicle seat for suppressing a submarining phenomenon of a seated person.

2. Description of the Background

It is known that when a traveling vehicle decelerates suddenly or is involved in a frontal collision, a so-called submarining phenomenon occurs in which the buttocks of a seated person move forward while sinking into a seat cushion. Japanese Unexamined Patent Application Publication No. 2004-058913 (Patent Literature 1) discloses a vehicle seat for suppressing the submarining phenomenon.

The vehicle seat disclosed in Patent Literature 1 includes a submarining regulation member having a pair of right and left support arms, one end of each arm being rotatably supported about an axis extending in the width direction of the seat, and a horizontal bar connected to the other end of each arm and extending in the left-right direction.

The submarining regulation member is arranged such that the horizontal bar is movable in a circular arc while being regulated by the energizing force of a coil spring between the lower rear part and the upper front part of the rotary fulcrum and is arranged to move in a circular arc in a direction resisting the energizing force with the movement of the lower back of the seated person when the submarining phenomenon occurs, thereby suppressing the progress of the submarining phenomenon.

The position of the buttocks of the seated person and the load applied to the seat when the submarining phenomenon occurs depend on the physique of the seated person.

For example, when the seated person is a child, the position of the buttocks is on the rear side of the buttocks of the adult since the buttocks of the child are smaller than those of the adult, and the load applied on the seat is smaller than that of the adult since the weight of the child is lighter than that of the adult.

The vehicle seat described in Patent Literature 1 does not consider such differences in the physique of the seated person. Accordingly, the suppression of the submarining phenomenon may differ depending on the size of the seated person, and there is a room for improvement.

SUMMARY

An object of the present disclosure is to provide a seat frame structure and a vehicle seat for satisfactorily suppressing a submarining phenomenon regardless of the physique of a seated person.

A vehicle seat according to a first aspect of the present disclosure includes a seat back and a cushion seat. The cushion seat includes a seat frame, a cushion pad portion above the seat frame a first submarining suppression portion below the cushion pad portion, and a second submarining suppression portion below the cushion pad portion. The second submarining suppression portion is arranged on a side of the first submarining suppression portion closer to the seat back.

BRIEF DESCRIPTION OF DRAWINGS

FIG. 7 is a schematic sectional view of the submarining suppression portion 3 and its vicinity with a small seated person H2 seated.

FIG. 8 is a schematic sectional view of the submarining suppression portion 3 and its vicinity in a submarining phenomenon of the small seated person H2.

DESCRIPTION OF EMBODIMENTS

Figure 1:
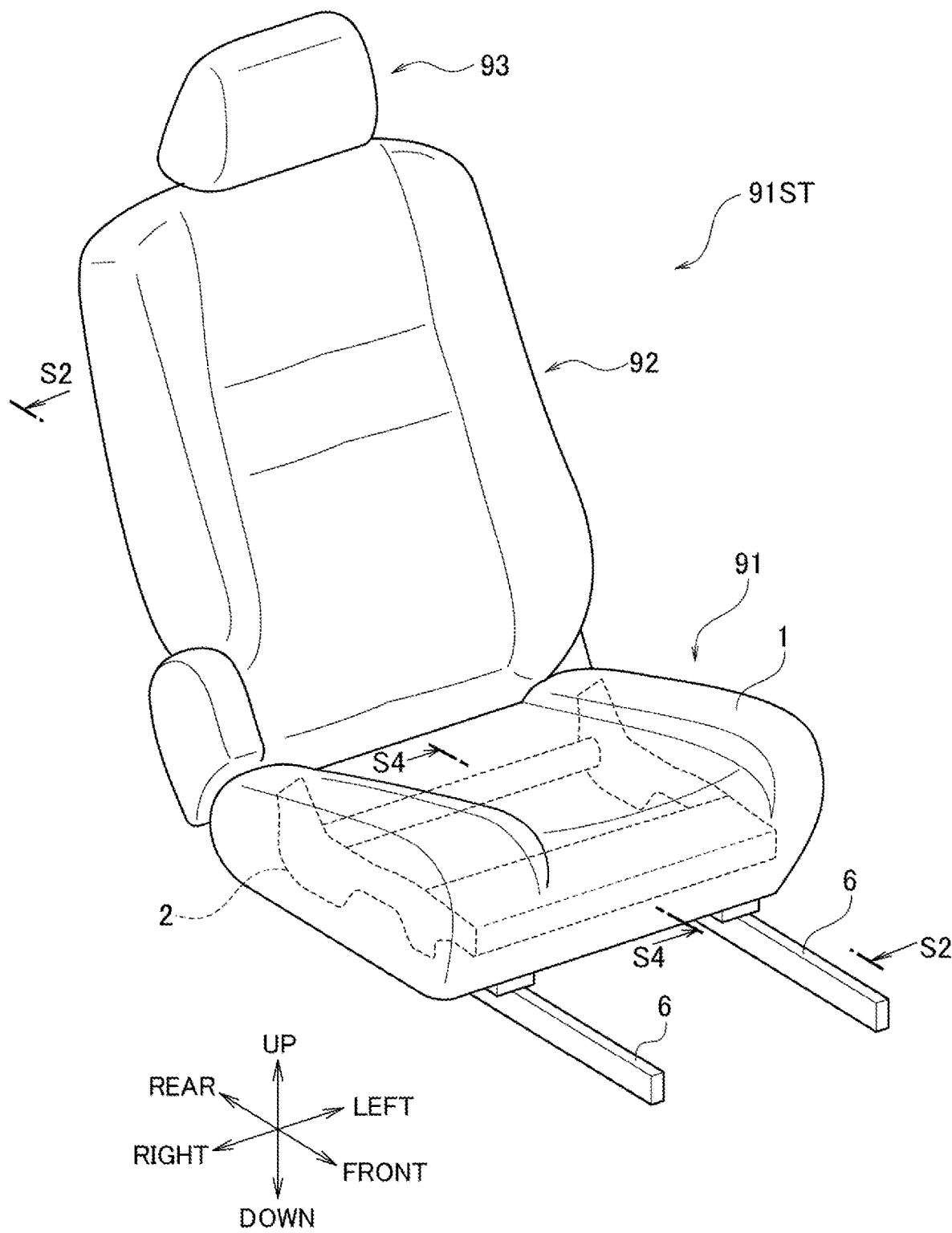
FIG. 1 is a perspective view of a vehicle seat 91ST that is an example of a vehicle seat according to an embodiment of the present disclosure.

A vehicle seat according to an embodiment of the present disclosure is described with reference to a vehicle seat 91ST as an example. FIG. 1 is a perspective view of the vehicle seat 91ST. For convenience of explanation, the up, down, left, right, front, and rear directions are defined by arrows in FIG. 1. The left-right direction is also referred to as the width direction of the vehicle seat 91ST.

As illustrated in FIG. 1, the vehicle seat 91ST includes a cushion seat 91, a seat back 92, and a headrest 93. A seat frame 2 and the like are put inside the cushion seat 91.

The vehicle seat 91ST is slidably attached to a pair of rails 6, 6 laid on the floor or the like of a vehicle.

The vehicle seat 91ST is a seat for an occupant of an automobile, for example, and is attached to the rails 6 to be movable in the front-rear direction.

The cushion seat 91 includes a seat frame structure FK including the seat frame 2, and a cushion pad portion 1 as a cushion arranged to cover the seat frame structure FK. The seat frame structure FK is formed substantially symmetrical.

The seat frame structure FK is described with reference to FIGS. 2 and 3.

Figure 2:
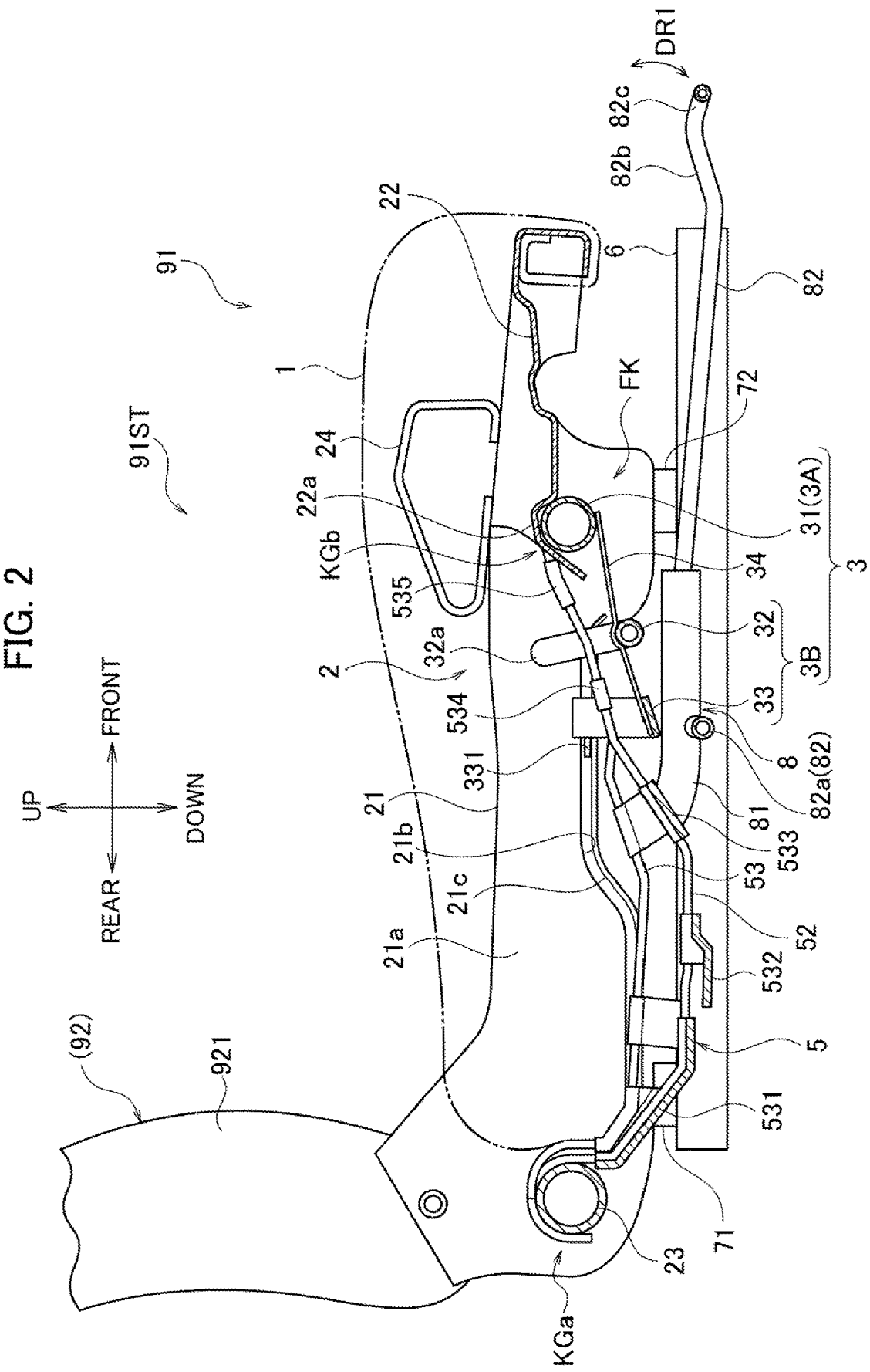
FIG. 2 is a sectional view taken along line S2-S2 in FIG. 1.

FIG. 2 is a longitudinal sectional view taken along line S2-S2 in FIG. 1. FIG. 3 is a perspective longitudinal sectional view of FIG. 2 viewed from the rear right obliquely above.

Figure 3:
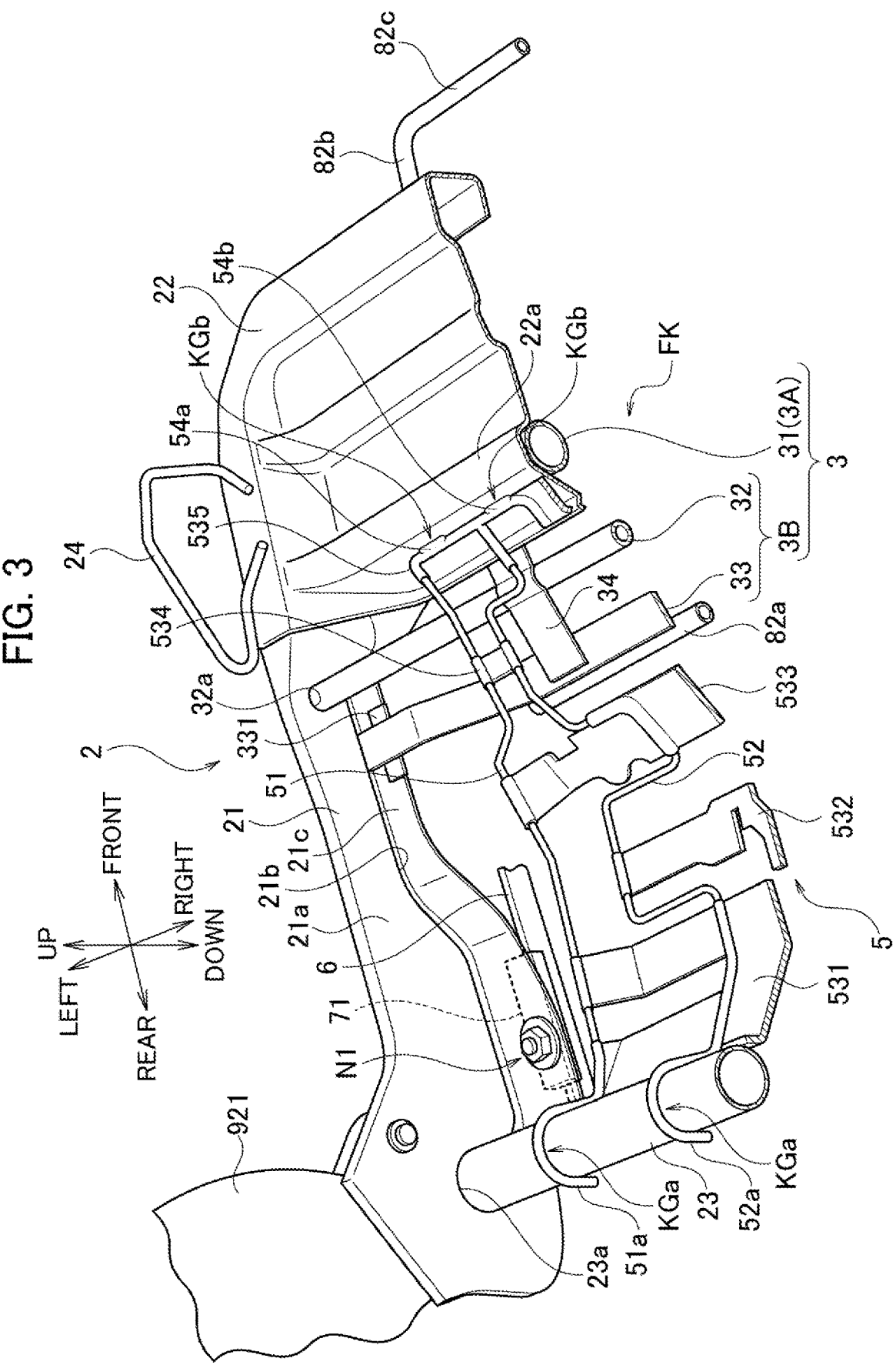
FIG. 3 is a half-sectional perspective view of FIG. 2 from the right rear obliquely above.

As illustrated in FIGS. 2 and 3, the seat frame structure FK includes the seat frame 2, a suspension unit 5, a slide lock unit 8, and a submarining suppression portion 3.

The seat frame 2 is formed in a frame shape including side frames 21 arranged on the left and right edge parts of the cushion seat 91, a front panel 22 connecting front parts of the side frames 21 arranged on the left and right, and a rear connecting bar 23 connecting rear parts of the side frames 21 in the left-right direction.

Each of the side frame 21 is a metal member extending in the front-rear direction and includes a base part 21a, a U-groove part 21b, and a flange part 21c.

The base part 21a is a plate-shaped part that has the length in the front-rear direction and is in an upright position in the up-down direction.

The U-shaped groove part 21b is connected to the lower end of the base part 21a and protrudes outward in the width direction to form a U-shaped groove sideways in the longitudinal section.

The flange part 21c is a part extending substantially horizontal inward in the width direction from the lower end of the U-shaped groove part 21b.

A seat back frame 921 that is a skeleton of the seat back 92 is connected to the rear end of the base part 21a of the side frame 21 such that the seat back frame 921 is able to recline by rotation about an axis extending in the left-right direction.

A slider 71 and a slider 72 engaged with the rail 6 to be movable back and forth are mounted at the lower part of the rear part and the front part of the side frame 21 by fixing tools N1 (only one is in FIG. 3).

The front panel 22 is a panel member that connects and fixes the front parts of the side frames 21 arranged on the left and right. At each of the left and right edges of the front panel 22, a pipe frame 24 is provided to stand in a frame shape.

The rear connecting bar 23 is a pipe member that connects and fixes the rear parts of the side frames 21 arranged on the left and right.

With this configuration, the seat frame 2 is formed in a rectangular frame shape and moves in the front-rear direction along the pair of rails 6.

The suspension unit 5 includes suspension wires 51, 52, and wire connecting portions 531 to 535.

The suspension wires 51, 52 are metal wires with spring property, extending in the front-rear direction and separated from each other on the outside and the inside in the left-right direction. The suspension wires 51, 52, as a pair, are arranged symmetrically on both sides in the seat frame structure FK.

The suspension wires 51, 52 are connected by the wire connecting portions 531 to 535 made from resin.

In the wire connecting portions 531 to 535, the foremost wire connecting part 535 is formed with engaging protruding parts 54a, 54b protruding forward at positions separated to left and right. The engaging protruding parts 54a, 54b are engaged with engagement holes (not shown) formed in the front panel 22 to form a front engagement part KGb.

The backmost parts of the suspension wires 51, 52 are engagement portions 51a, 52a in a hook shape. The engagement portions 51a, 52a are hooked over the rear connecting bar 23 to form a rear engagement part KGa.

As described above, the suspension unit 5 has the foremost part engaged with the front panel 22 at the front engagement part KGb and the backmost part engaged with the rear connecting bar 23 at the rear engagement part KGa. Thus, in the seat frame structure FK, the suspension unit 5 is suspended and supported to be elastically deformable downward.

As illustrated in FIG. 2, the cushion pad portion 1 that is positioned by the pipe frame 24 is placed above the suspension unit 5.

The cushion pad portion 1 houses a pad 11 of urethane foam inside and can be elastically compressed at least in the up-down direction.

With a seated person on the cushion seat 91, a downward force is applied to the cushion pad portion 1 from the buttocks and thighs of the seated person. Thus, the cushion pad portion 1 is compressed downward, and the suspension unit 5 on which the cushion pad portion 1 is placed is also elastically deformed downward.

The seated person can obtain a good seating feeling by upward elastic repulsive force of the cushion pad portion 1 and upward elastic repulsive force of the suspension unit 5 against the downward force applied to the cushion pad portion 1.

As illustrated in FIG. 2, the slide lock unit 8 includes a unit body 81 and a towel bar 82 for operating the unit body 81.

The unit body 81 is arranged at a low position near the rails 6 of the vehicle with the vehicle seat 91ST attached to the rails 6 and has a mechanism for selecting whether to prohibit or allow the forward and backward movement of the seat frame 2 relative to the rails 6.

The towel bar 82 is a pipe member having a rectangular frame shape in a top view and has a side bar part 82b extending in the front-rear direction on the left and right, a rear bar part 82a connecting the side bar parts 82b in the left-right direction at the rear, and a front bar part 82c connecting the side bar parts 82b in the left-right direction at the front.

The towel bar 82 is connected to the unit body 81 on the side near the rear bar part 82a, and the front bar part 82c is vertically rotatable within a predetermined range as illustrated by an arrow DR1 with its end part near the rear bar part 82a serving as a rotary fulcrum. The front bar part 82c is normally positioned at the lower end in the rotation range by an energizing member (not shown).

When the seated person lifts up the front bar part 82c by hand, the cushion seat 91 becomes movable forward and backward relative to the rails 6. When the seated person releases his/her hand from the lifted front bar part 82c, the front bar part 82c is moved back to the lower end position by the energizing member, and the cushion seat 91 is in a locked state with its forward and backward movement restricted.

The rear bar part 82a of the towel bar 82 is arranged near the center in the front-rear direction of the seat frame 2 at a low position corresponding to the rails 6 below the suspension unit 5.

The submarining suppression portion 3 includes a front suppression member 31 as a first suppression member, an intermediate suppression member 32 as a second suppression member, a rear suppression member 33 as a third suppression member, and a connecting member 34.

The front suppression member 31 is a metal tubular member extending in the left-right direction and is formed from, for example, a steel pipe.

The front suppression member 31 has its left and right ends joined to the side frames 21 and has its intermediate part joined to the front panel 22 to be accommodated under an rear side drawn part 22a formed to protrude upward at the rear edge part of the front panel 22.

Thus, the front suppression member 31 is substantially integrated with the side frame 21 and the front panel 22 and thus has high bending rigidity.

When the total length of the seat frame 2 in the front-rear direction is 1, the front suppression member 31 is arranged at a position approximately ⅓ to ¼ from the front end.

The intermediate suppression member 32 is a metal tubular member extending in the left-right direction and is formed from, for example, a steel pipe.

The intermediate suppression member 32 has the center part in the left-right direction formed to be slightly bent downward, and the left and right ends joined to the side frames 21 at joining parts 32a.

The intermediate suppression member 32 has an outer diameter smaller than that of the front suppression member 31, and bending rigidity smaller than that of the front suppression member 31.

The intermediate suppression member 32 is arranged at a position slightly forward of the center position in the front-rear direction of the seat frame 2.

The rear suppression member 33 is a metal plate member extending in the left-right direction and is formed from, for example, a steel plate.

The rear suppression member 33 has each of the left and right ends joined via a seat plate 331 to the upper surface of the flange part 21c of the side frame 21.

The rear suppression member 33 has the center part formed to position below both the left and right end parts by applying gentle step bending and to be inclined in such a manner that the front edge of the center part is slightly higher than the rear edge.

The rear suppression member 33 is arranged at a substantially center position in the front-rear direction of the seat frame 2.

The intermediate suppression member 32 is arranged at a distance behind and below the front suppression member 31. The rear suppression member 33 is arranged at a distance behind and below the intermediate suppression member 32.

The rear suppression member 33 is arranged between the suspension wires 51, 52 and the rear bar part 82a below the suspension wires 51, 52.

The rear suppression member 33 has a plate shape and is arranged in an almost prone position, and the bending rigidity against downward force is smaller than that of the front suppression member 31.

The front suppression member 31, the intermediate suppression member 32, and the rear suppression member 33 are connected in the front-rear direction by the connecting member 34. The connecting member 34 is provided on each of the left and right sides in the width direction of the seat frame structure FK.

The connecting member 34 is a plate-like member that is joined to the front suppression member 31 at the lower side of the front suppression member 31, joined to the intermediate suppression member 32 along the upper outer periphery of the intermediate suppression member 32, and joined to the rear suppression member 33 at the upper surface of the rear suppression member 33.

The submarining suppression portion 3 is functionally classified into a first submarining suppression portion 3A and a second submarining suppression portion 3B. Hereinafter, the first submarining suppression portion 3A is referred to as the first suppression portion 3A, and the second submarining suppression portion 3B is referred to as the second suppression portion 3B.

The first suppression portion 3A is the front suppression member 31 having the highest bending rigidity and arranged at the forefront among the submarining suppression portion 3. The second suppression portion 3B is arranged on the rear side of the front suppression member 31 and includes the intermediate suppression member 32 and the rear suppression member 33 each having bending rigidity smaller than that of the front suppression member 32.

When a submarining phenomenon of a seated person having a physique and a weight corresponding to an adult occurs, the first suppression portion 3A mainly receives a force applied from the seated person via the cushion pad portion 1 to suppress the submarining phenomenon. The seated person having a physique and a weight corresponding to an adult is hereinafter referred to as a large seated person H1.

When a submarining phenomenon of a seated person, such as a child smaller in physique and weight than the adult occurs, the second suppression portion 3B mainly receives a force applied from the seated person via the cushion pad portion 1 to suppress the submarining phenomenon. The seated person having a physique and a weight corresponding to the child smaller in physique and weight than the adult is hereinafter referred to as a small seated person H2.

Next, with reference to FIGS. 4 to 8, suppression of the submarining phenomenon by the submarining suppression portion 3 is described.

Figure 4:
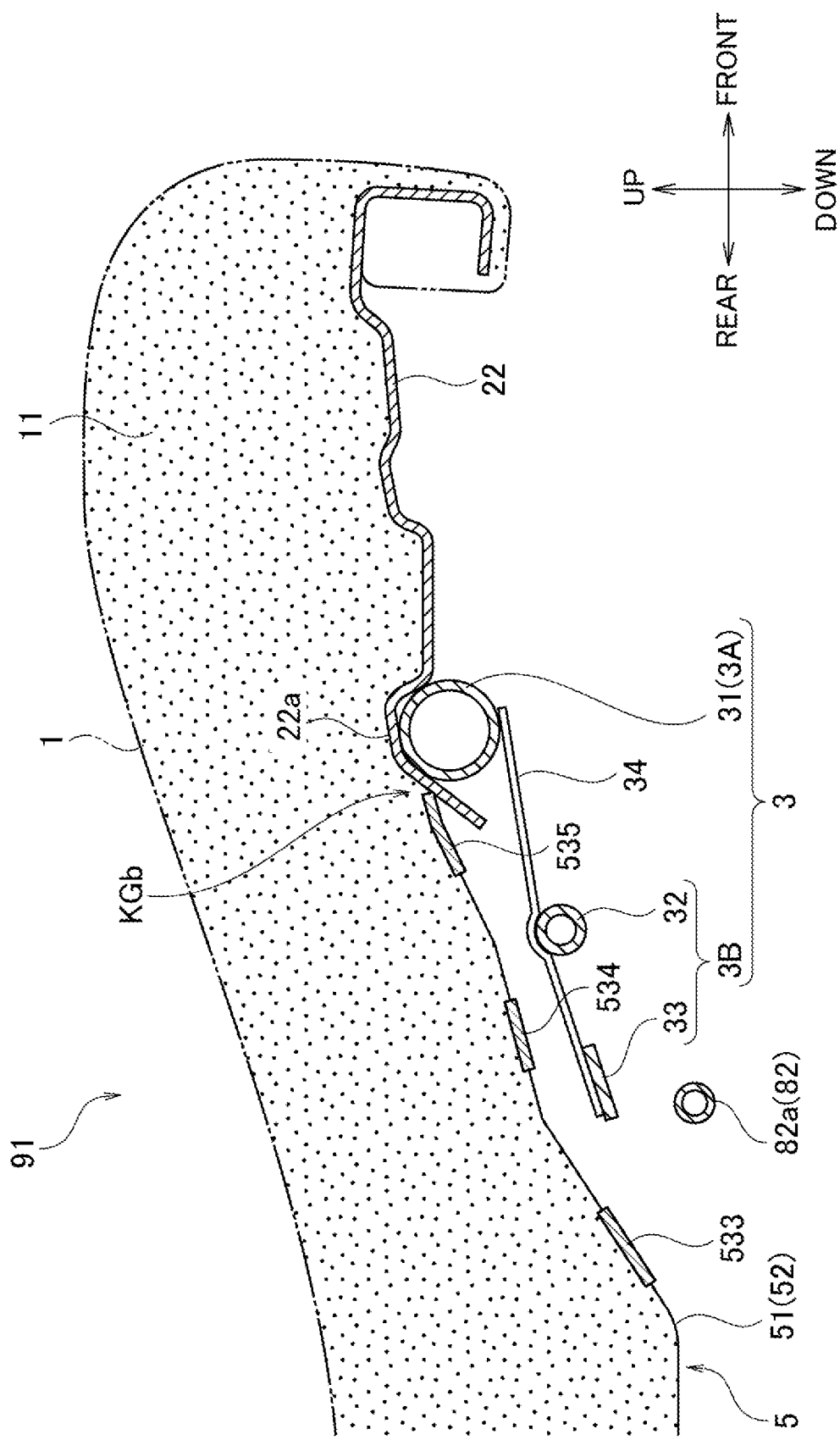
FIG. 4 is a schematic sectional view of a submarining suppression portion 3 and its vicinity taken along line S4-S4 in FIG. 1.

FIG. 4 is a schematic sectional view of the submarining suppression portion 3 and its vicinity taken along line S4-S4 in FIG. 1, in a natural state with no seated person.

Figure 5:
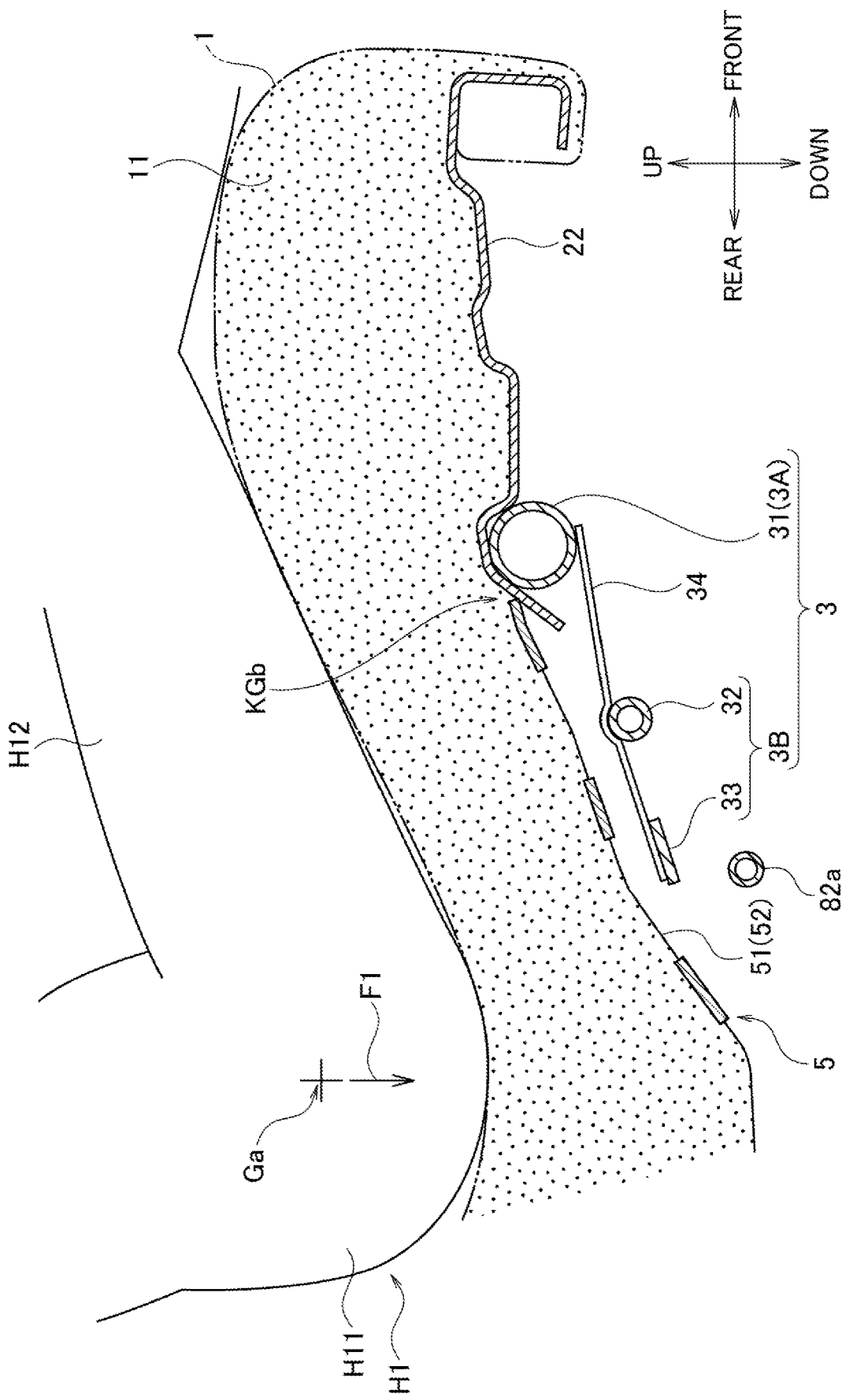
FIG. 5 is a schematic sectional view of the submarining suppression portion 3 and its vicinity with a large seated person H1 seated.
Figure 6:
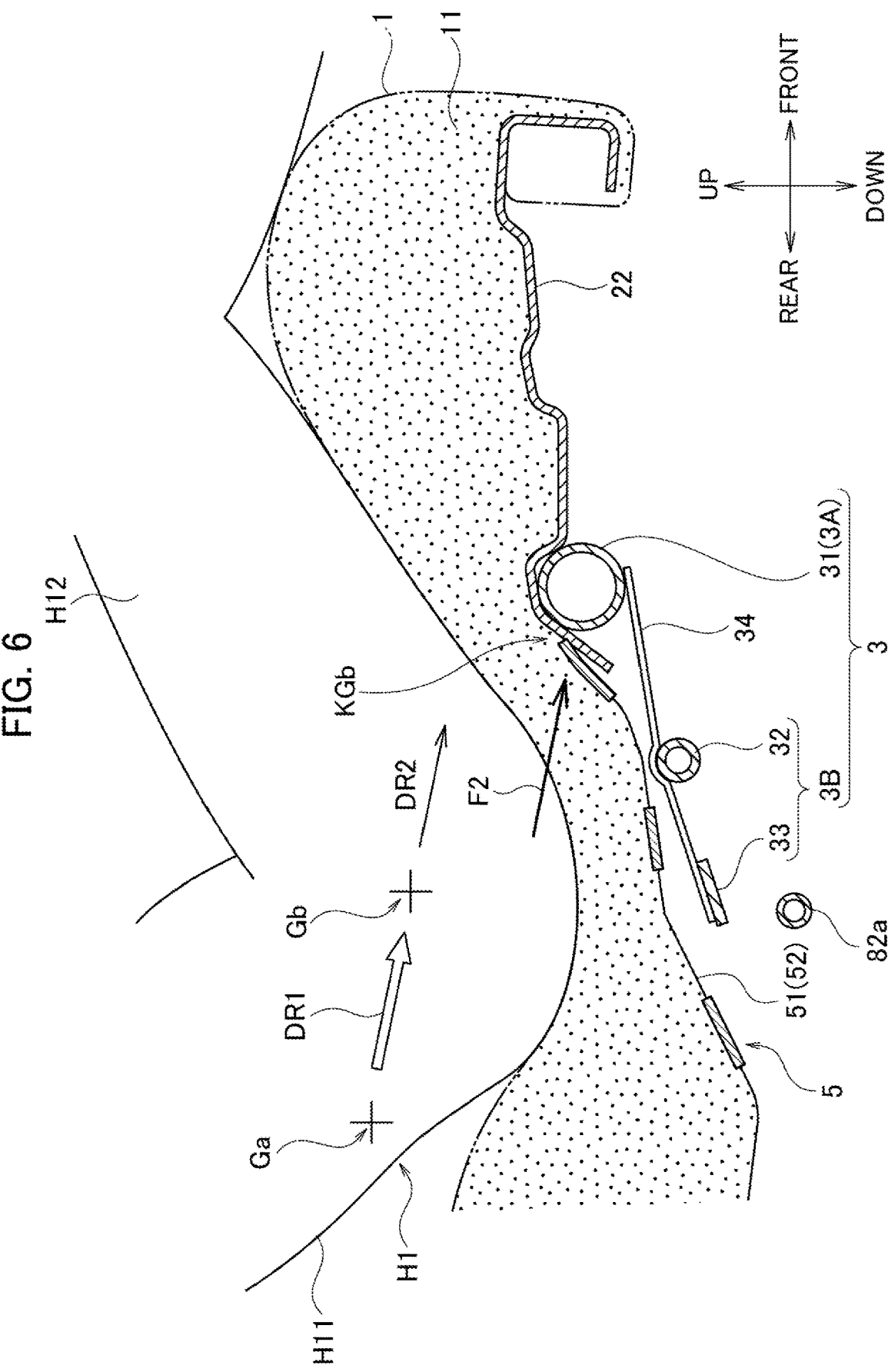
FIG. 6 is a schematic sectional view of the submarining suppression portion 3 and its vicinity in a submarining phenomenon of the large seated person H1.

FIG. 5 is a schematic sectional view of the submarining suppression portion 3 and its vicinity with the large seated person H1 seated. FIG. 6 is a schematic sectional view of the submarining suppression portion 3 and its vicinity in the submarining phenomenon of the large seated person H1.

FIG. 7 is a schematic sectional view of the submarining suppression portion 3 and its vicinity with the small seated person H2 seated. FIG. 8 is a schematic sectional view of the submarining suppression portion 3 and its vicinity in the submarining phenomenon of the small seated person H2.

As illustrated in FIG. 4, in the natural state with no seated person, the cushion pad portion 1 is in an uncompressed state, and the suspension unit 5 is not substantially deformed and is positioned at a predetermined distance apart above the submarining suppression portion 3.

With the large seated person H1 seated as illustrated in FIG. 5, the buttocks H11 and thighs H12 of the large seated person H1 push the cushion pad portion 1 downward. The force of the buttocks H11 pushing the cushion pad portion 1 is much larger than the force of the thighs H12 pushing the cushion pad portion 1 downward.

The force application can be expressed as a simple model for the large seated person H1, in which the mass of the buttocks H11 and upper body of the large seated person H1 is applied, from the buttocks H11 to the cushion pad portion 1, as a force F1 acting from a center of gravity of buttocks Ga set as a position of the center of gravity of the buttocks H11.

The center of gravity of buttocks Ga is positioned substantially at the center in the left-right direction and is positioned above the rear suppression member 33 or slightly rearward of the rear suppression member 33 in the front-rear direction. With the large seated person H1 seated, the suspension unit 5 receives a downward force from the large seated person H1 through the cushion pad portion 1 to be deformed to move entirely downward with the front engagement part KGb as a fulcrum.

As illustrated in FIG. 6, when the submarining phenomenon of the large seated person H1 occurs, the buttocks H11 move forward and slightly obliquely downward by inertial force. That is, the position of the center of gravity of buttocks Ga moves forward and slightly obliquely downward, as illustrated by the arrow DR1, to the position of a center of gravity of buttocks Gb and further moves as illustrated by the arrow DR2 as the submarining phenomenon progresses.

Accordingly, from the buttocks H11 to the cushion pad portion 1, a forward slightly oblique downward force F2 is mainly applied to the front suppression member 31 that is the first suppression portion 3A.

As described above, the front suppression member 31 is a tubular member having a relatively large outer diameter and is integrated with the front panel 22 to have increased bending rigidity.

The front suppression member 31 that is the first suppression portion 3A receives and absorbs the force F2 applied and energy accompanying the force F2 without substantial deformation or with slight deformation.

Thus, the movement of the buttocks H11 in the arrow DR2 is regulated, and the submarining phenomenon of the large seated person H1 is satisfactorily suppressed.

With the small seated person H2 seated as illustrated in FIG. 7, the buttocks H21 and thighs H22 of the small seated person H2 push the cushion pad portion 1 downward. The force of the buttocks H21 pushing the cushion pad portion 1 is larger than the force of the thighs H22 pushing the cushion pad portion 1 downward.

The force application can be expressed as a simple model for the small seated person H2, in which the mass of the buttocks H21 and upper body of the small seated person H2 is applied, from the buttocks H21 to the cushion pad portion 1, as a force F3 acting from a center of gravity of buttocks Gc set as a position of the center of gravity of the buttocks H21.

The center of gravity of buttocks Gc is positioned substantially at the center in the left-right direction. Since the physique of the small seated person H2 is smaller than that of the large seated person H1, the position of the center of gravity of buttocks Gc of the small seated person H2 in the front-rear direction is rearward of the center of gravity of buttocks Ga of the large seated person H1 illustrated in FIG. 5 and is further away from the rear suppression member 33.

Moreover, since the buttocks H21 of the small seated person H2 are smaller than the buttocks H11 of the large seated person H1, the suspension unit 5 is deformed to locally move downward at a position behind the rear suppression member 33.

As illustrated in FIG. 8, when the submarining phenomenon of the small seated person H2 occurs, the buttocks H21 move forward and obliquely downward by inertial force. That is, the position of the center of gravity of buttocks Gc moves forward and obliquely downward, as illustrated by an arrow DR3, to the position of a center of gravity of buttocks Gd and further moves as illustrated by an arrow DR4 as the submarining phenomenon progresses.

Accordingly, from the buttocks H21 to the cushion pad portion 1, a force F4 is applied obliquely forward and downward. Moreover, since the buttocks H21 of the small seated person H2 are small, the suspension unit 5 locally largely deforms downward depending on the degree of the submarining phenomenon and abuts on the intermediate suppression member 32 and the rear suppression member 33 that are the second suppression portion 3B to apply a force F5 and a force F4 on the intermediate suppression member 32 and the rear suppression member 33, respectively.

The intermediate suppression member 32 and the rear suppression member 33 each have bending rigidity smaller than that of the front suppression member 31. In contrast, the force F4 and the force F5 are each smaller than the force F2 applied by the large seated person H1 illustrated in FIG. 6.

Accordingly, the intermediate suppression member 32 and the rear suppression member 33 that are the second suppression portion 3B receive and absorb the force F5 and the force F4 applied and energy accompanying the force F5 and the force F4 without substantial deformation or with slight deformation.

Thus, the movement of the arrow DR4 of the buttocks H21 is regulated, and the submarining phenomenon of the small seated person H2 is satisfactorily suppressed.

As described above, the vehicle seat 91ST independently includes the first suppression portion 3A for suppressing the submarining phenomenon of the large seated person H1 having a physique and a weight corresponding to the adult, and the second suppression portion 3B for suppressing the submarining phenomenon of the small seated person 112 having a physique and a weight corresponding to the child.

The second suppression portion 3B is arranged behind the first suppression portion 3A because the thickness of the buttocks H21 of the small seated person H2 in the front-rear direction is smaller than that of the buttocks H11 of the large seated person H1 in the front-rear direction, and the seat back 92 to which the back touches becomes a reference position.

Since the force F4 and the force F5 applied to the cushion pad portion 1 when the submarining phenomenon of the small seated person H2 occurs are each smaller than the forces F2 applied to the cushion pad portion 1 when the submarining phenomenon of the large seated person H1 occurs, the second suppression portion 3B includes multiple members each having bending rigidity smaller than that of the first suppression portion 3A.

Thus, the second suppression portion 3B includes at least one of a plate material or a pipe material having a diameter smaller than that of the front suppression member 31 of the first suppression portion 3A. This saves the space of the second suppression part 3B and reduces the cost of the second suppression part 3B.

Since the space of the second suppression portion 3B can be saved in this way, as illustrated in FIGS. 2 and 3, the rear bar part 82a that is a part of the towel bar 82 is arranged below the second suppression portion 3B, enabling roomy arrangement even in a space with little free space in the up-down direction.

Moreover, since the second suppression portion 3B can be arranged in a small space, when the second suppression portion 3B is arranged between the rear bar part 82a and the suspension unit 5 above the rear bar part 82a, the position of the suspension unit 5 can be set lower.

This enables the vehicle seat 91ST to lower the hip point of the cushion seat 91, and thus the vehicle seat 91ST is easily mounted on a variety of vehicles, such as a sports type.

According to the present disclosure, the submarining phenomenon is suppressed satisfactorily regardless of the physique of the seated person.

The present disclosure is not limited to the embodiments described above, and can be variously modified without departing from the gist of the present disclosure.

The intermediate suppression member 32 and the rear suppression member 33 of the second suppression portion 3B are not limited to pipe material and plate material, respectively. Both members may be pipe material, or both members may be plate material.

The connecting member 34 may not be provided. The connecting member 34 integrates the intermediate suppression member 32 and the rear suppression member 33 to improve the bending rigidity as a whole. Accordingly, when the vehicle seat 91ST includes the connecting member 34, the intermediate suppression member 32 and the rear suppression member 33 each can have bending rigidity smaller than that without the connecting member 34. For example, it is possible to reduce the pipe diameter of the intermediate suppression member 32 and the plate thickness of the rear suppression member 33, thereby further achieving space saving, cost reduction, and weight reduction of the submarining suppression portion 3.

In the vehicle seat 91ST provided with the connecting member 34, the first suppression portion 3A and the second suppression portion 3B are integrated, so that the force received by one of the first suppression portion 3A and the second suppression portion 3B is dispersed to the other.

Accordingly, a material having small bending rigidity is selectable as a constituent material for the submarining suppression portion 3, and the cost reduction of the submarining suppression portion 3 is achieved.

Using plate material for at least one of the intermediate suppression member 32 or the rear suppression member 33 reduces the bending stress generated by the force F4 and the force F5 from the small seated person H2. Further, increasing the area of the plate material similarly reduces the bending stress generated by the force F4 and the force F5 from the small seated person H2.

In any case, it is possible to use an inexpensive material having less bending rigidity as the plate material for the submarining suppression portion 3, and the cost reduction is achieved.

The material of the first suppression portion 3A and the second suppression portion 3B is not limited to metals. A highly rigid resin material, such as a fiber reinforced resin, may be used.

The positions of the first suppression portion 3A and the second suppression portion 3B in the front-rear direction with respect to the seat frame 2 are different depending on the overall length of the seat frame 2 and the setting of the hip points of the large seated person H1 and the small seated person H2 and thus are not limited to the above-described positions.

The second suppression portion 3B is not limited to being made of two members of the intermediate suppression member 32 and the rear suppression member 33 as described above. It may be made of a total of three or more members arranged side by side, including the intermediate suppression member 32 and the rear suppression member 33.

The invention claimed is:

1. A vehicle seat, comprising:
   a seat back;
   a seat cushion; and
   side frames arranged on left and right edge parts of the seat cushion, wherein the seat cushion comprises:
   a seat frame;
   a cushion pad portion above the seat frame;
   a first submarining suppression portion below the cushion pad portion; and
   a second submarining suppression portion below the cushion pad portion, the second submarining suppression portion arranged on a side of the first submarining suppression portion closer to the seat back,
   wherein the first submarining suppression portion is a first suppression member in a tubular shape extending lengthwise in a width direction of the vehicle seat and having left and right ends joined to the side frames,
   wherein the second submarining suppression portion is a second suppression member in a tubular or plate shape extending lengthwise in the width direction and having left and right ends joined to the side frames; and
   a third suppression member in a tubular or plate shape extending lengthwise in the width direction and having left and right ends joined to the side frames and
   a connecting member that is located between the side frames,
   wherein the connecting member is joined to the first suppression member at a lower side of the first suppression member, joined to the second suppression member along an upper side of the second suppression member, and joined to the third suppression member at an upper side of the third suppression member.

2. The vehicle seat according to claim 1, further comprising: a suspension unit between the cushion pad portion and the first and second submarining suppression portions.

3. The vehicle seat according to claim 1, further comprising: a slide lock unit configured to select whether to prohibit or allow movement of the seat frame relative to a rail on a vehicle floor; and a towel bar in a frame shape configured to operate the slide lock unit, wherein a part of the towel bar is below the second submarining suppression portion.

4. The vehicle seat according to claim 1, wherein the connecting member is a plate-shaped member.

5. The vehicle seat according to claim 1, wherein the third suppression member is formed to be bent downward at a center portion of the third suppression member.

* * * * *